Nov. 13, 1962  W. A. NIEMANN  3,063,429
COMPRESSION UNIT
Filed Sept. 13, 1960  3 Sheets-Sheet 1

Inventor
WALTER A NIEMANN
By Soans, Anderson, Luedeka & Fitch
Attys

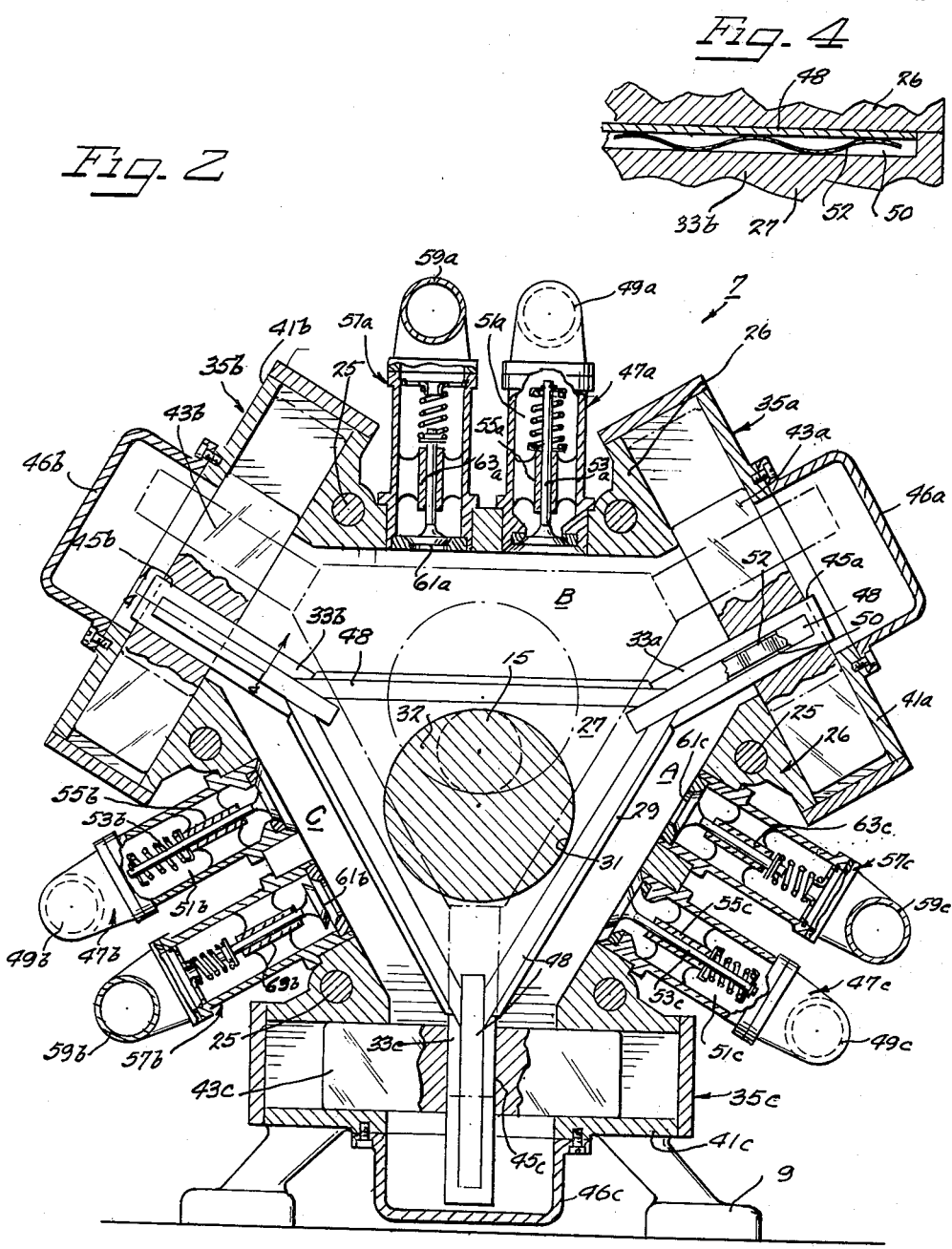

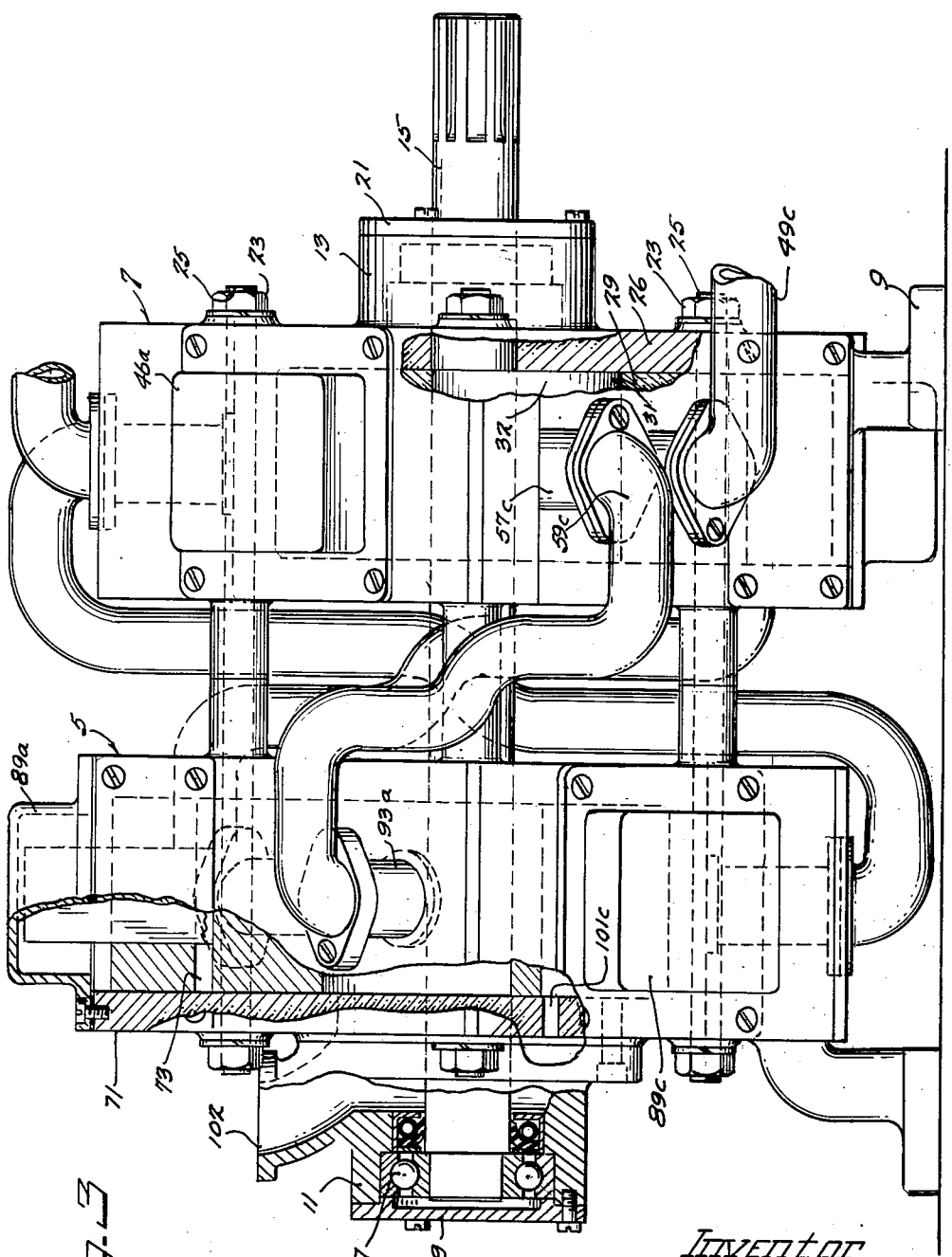

United States Patent Office 3,063,429
Patented Nov. 13, 1962

3,063,429
COMPRESSION UNIT
Walter A. Niemann, P.O. Box 27, Powers, Mich.
Filed Sept. 13, 1960, Ser. No. 55,772
3 Claims. (Cl. 121—68)

The present invention relates generally to internal combustion engines and, more particularly, this invention relates to a new type of internal combustion engine for more efficiently converting combustible liquid or gaseous materials into power.

There are numerous types of internal combustion engines and, generally speaking, there are the classical reciprocating engine, the turbine engine, and the rotary engine. However, these engines involve the use of several parts and are not readily adapted to lightweight units. Furthermore, in some cases, there is a pulsing power which is delivered which results in vibration and power loss. This is particularly the case in connection with the reciprocating engine. The rotary engine, on the other hand, involves some unusual motions and is somewhat difficult to build.

It is a principal object of this invention to provide an improved internal combustion engine. It is a further object of this invention to provide an engine which can be made with minimum weight and which delivers a smooth flow of power to a driven device. It is an additional object of this invention to provide an internal combustion engine which has a low degree of vibration and a high conversion of power. The accomplishment of these and other objects will be found by reference to the following description and accompanying drawings, in which:

FIGURE 2 is an end view of a charger or compressor, also partially broken away, which is utilized in association with the engine shown in FIGURE 1;

FIGURE 3 is a front view showing the relation between the engine shown in FIGURE 1 and the compressor shown in FIGURE 2. In this view certain parts of the engine are also broken away, and FIGURE 4 is a sectional view taken along line 4—4 of FIGURE 2, showing the sealing used in the compressor shown in that figure.

Figure 1:
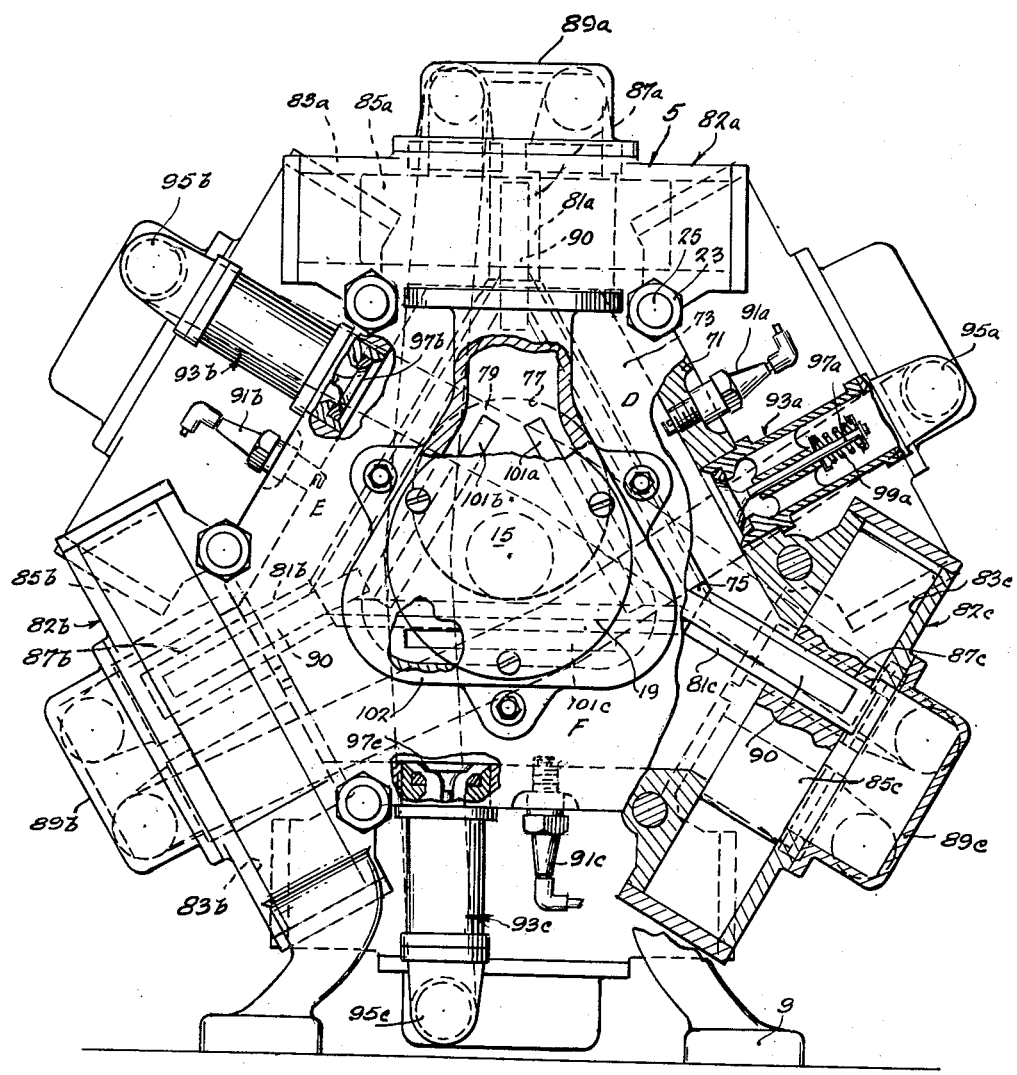
FIGURE 1 is an end view of an engine, partially broken away, embodying various principles of this invention.

The engine of this invention which is to be hereinafter described, may be used to drive any of a number of driven units and no driven unit is shown in the drawings. Furthermore, the engine of this invention is used in association with a carburetor which can be provided by anyone skilled in the art and with a spark delivering device, such as a distributor, which can also be provided by one skilled in the art.

As above indicated, the unit of the invention comprises an engine 5 and a compressor or charger 7. The engine and compressor are supported upon a base 9 which will generally be an iron casting. The casting may include an end journal 11 and a support journal 13 through which extends a splined shaft 15. The end journal and support journal may be provided with ball bearings 17 in which the shaft 15 turns. The end journal 11 is provided with an end plate 19 and the support journal 13 may be provided with an annular plate 21 through which the shaft 15 extends. The engine 5 and compressor 7 are bolted together by means of nuts 23 and bolts 25 which may also serve to hold the engine 5 and compressor 7 in the casting 9.

The compressor 7 comprises a housing 26 having a chamber which is generally polygonal in cross-section and which in the illustrated embodiment is generally triangular in cross-section. In this housing there is a web or spider 27 which is of the same general configuration as the chamber in the housing 26 and it has a central section 29 which is generally triangular in shape, as shown in FIGURE 2, the central section 29 being provided with a centrally disposed circular opening 31 in which is disposed a circular disc 32. The disc 32 rotates within the opening 31. The shaft 15 extends through the disc 32 and is eccentric to the center of the disc. The shaft is swaged or keyed to the disc so that there is no relative movement between the shaft 15 and disc 32.

The spider 27 is provided with guide means which, in the illustrated embodiment, comprises outwardly extending arms 33a, 33b and 33c. These guide arms each extend radially outwardly from the center of the opening 31 and from the corners of the triangular section 29 of the spider 27. Each of the arms 33a, 33b and 33c extend into guides 35a, 35b and 35c which are located on the outer section of the compressor housing 26. The guides may comprise means 41a, 41b and 41c which define piston cylinders in which are disposed pistons 43a, 43b and 43c. Each of the pistons 43a, 43b and 43c is provided with a slot 45a, 45b and 45c in which the guide arms 33a, 33b and 33c reciprocate. The illustrated pistons 43a, 43b and 43c are wider than the section 29 and arms 33a, 33b and 33c of the spider 27, and the cylinders 41a, 41b and 41c are proportioned accordingly to receive and guide the pistons.

On the cylinders 41a, 41b and 41c are mounted caps 46a, 46b and 46c which accommodate the movement of the ends of the guide arms 33a, 33b and 33c. These caps can be removed to permit access to the chamber in the housing 26.

As shown in FIGURE 2, spring loaded sealing bars 48 are provided on both faces of the spider section 29 and arms 33a, 33b and 33c, to provide more efficient operation of the compressor. In FIGURE 4, the sealing bars 48 are shown received in grooves 50 in the spider 27 and biased outwardly against the walls of the housing 26 by corrugated ribbon springs 52 located in the bottoms of the grooves 50.

The walls of the chamber in the housing 26, the sides of the spider 27, the sealing bars 48, and the pistons 43a, 43b and 43c define three compression chambers A, B and C in which the fuel for the engine is compressed.

Mounted on the compressor housing 26 and in communication with the chamber in the housing are intake valve units 47a, 47b and 47c which are in communication with a carburetor, not shown. These valve units each connect to an intake conduit 49a, 49b and 49c which connect between the carburetor and a valve chamber 51a, 51b and 51c. In each valve chamber is disposed a valve 53a, 53b and 53c which extends through guide elements 55a, 55b and 55c.

Also mounted on the housing 26 of the compressor 7 are outlet valve units 57a, 57b and 57c. These outlet units are constructed similarly to the inlet valve unit 47a, 47b and 47c and each includes an outlet conduit 59a, 59b and 59c which connects to the engine 5, to be hereinafter described. In the outlet valve units are disposed valves 61a, 61b and 61c which close off openings to the compression chambers A, B and C. These valves 61a, 61b and 61c are supported in guides 63a, 63b and 63c in the outlet valve units.

As before indicated, the compressor 7 connects through the outlet conduits 59a, 59b and 59c to the engine 5. The engine 5 generally comprises a housing 71 in which is located a chamber 73. The chamber 73 is polygonal in shape and in the illustrated embodiment is generally triangular in shape.

Located within the chamber is a spider 75 which is generally similar to the spider 27 utilized in the compressor 7. A circular opening 77 is located centrally of the spider 75. In this opening, there is located a circular disc 79 which rotates in the opening 77. The shaft 15 is swaged or keyed to the disc 79 so as to rotate with the disc within the opening 77. It will be apparent that relative movement between the shaft 15 and the disc 79 is not possible.

The spider 75 is provided with radially extending guide arms 81a, 81b and 81c which radially extend from the center of the disc 79 and which extend from the corners of the spider 75.

These radially extending arms 81a, 81b and 81c extend into guide means 82a, 82b and 82c which, in the illustrated embodiment, comprise three cylinders 83a, 83b and 83c mounted on the housing 71. In the cylinders are located pistons 85a, 85b and 85c which are provided with slots 87a, 87b and 87c through which extend the radially extending arms 81a, 81b and 81c. As with the compressor, the pistons 85, 85b and 85c are wider than the spider 75 and the cylinders 83a, 83b and 83c are proportioned to receive them. As in the case of the compressor 7, and as shown in FIGURE 1, spring loaded sealing bars 90 are provided on the spider 75 to provide more efficient operation of the engine. Mounted on the cylinders are caps 89a, 89b and 89c which accommodate movement of the radially extending guide arms 81a, 81b and 81c and permit access to the engine while also serving to seal and protect the parts.

The spider 75, walls of the chamber 73 of the housing 71, the sealing bars, and the pistons 85a, 85b and 85c provide three combustion chambers D, E and F in the chamber 73, as is particularly shown in FIGURE 1. In each of the combustion chambers D, E and F is a spark plug 91a, 91b and 91c which connect to a distributor or the like to provide timed combustion in the combustion chambers.

Each of the combustion chambers communicates with an inlet valve unit 93a, 93b and 93c which comprises an inlet conduit 95a, 95b and 95c which conduit communicates with the outlet conduits 59a, 59b and 59c of the compressor 7. Each valve unit comprises a spring loaded valve 97a, 97b and 97c which is biased by means of a spring 99a, 99b and 99c.

The gases exhaust from the respective combustion chambers D, E and F through exhaust slots 101a, 101b and 101c located in the housing 71. These exhaust slots communicate with an exhaust opening 102 which vents to suitable exhaust pipes.

Now considering the operation of the engine 5 which is particularly shown in FIGURE 1, in combustion chamber E, the compressed fuel is being fired as the spider 75 is moving away from the wall of the housing 71, while in combustion chamber F the gases are being exhausted from the exhaust port 101c as fuel from the compressor is introduced into said chamber F. In combustion chamber D the fuel is being compressed as the spider 75 moves toward the wall of the housing 71. The combustion chambers fire in order as the spider 75 moves in a circular path about the center of the shaft 15. As the spider moves, the guide arms 81a, 81b and 81c reciprocate in the slots 87a, 87b and 87c of the pistons and these guide arms also cause the pistons 85a, 85b and 85c to move in the cylinders 83a, 83b and 83c. As the spider 75 is forced in its circular path about the center of the shaft 15, the disc 79 turns within the opening 77 in the spider 75 and causes the shaft 15 which is fixedly connected to the disc, to rotate. Thus the shaft 15 is moved.

It will be seen that in the operation of the engine, the parts do not move great distances and it will also be seen that the motion is rotary so that there is not great wearing of the parts. Furthermore, the engine provides minimum vibration to the unit.

It will be apparent to those skilled in the art that various compressors may be used to compress the fuel for delivery to the engine and for most efficient operation of the engine. However, the compressor shown in the drawings is particularly satisfactory for providing timed input to engine 5 shown in FIGURE 1. Considering the operation of the compressor which is particularly shown in FIGURE 2, the fuel is drawn into the chambers A, B and C through the intake valves 49a, 49b and 49c, as is illustrated in chamber B in FIGURE 2. The fuel is then compressed and delivered from one of the outlet valve units 57a, 57b and 57c, the compressed gas being delivered out of the conduits 59a, 59b and 59c. Since the shaft 15 is common to the engine 5 and the compressor 7, it will be seen that the compressed gases can be delivered in timed relation to the engine 5. The two positions of the spider 27 are shown in FIGURE 2 and these illustrate the movement of the spider in the compressor. The relation of the spider 27 to the shaft 15 and the disc in the opening 31 are the same as in connection with the described operation of the engine 5.

Various guide means can be used for the spiders in the engine and compressor. It is important that the guide means maintain the alignment of the spider in the chambers of the engine and compressor, and that the guide means close off the chambers in the engine or compressor. Thus the arms extending from the spider can connect to eccentrics and various shutter arrangements can be utilized. It should be noted that the engine of this invention can readily be constructed as a four cycle engine by employing either sliding or rotary disc type valves commonly known to the art.

The various features of the invention which are believed to be new are set forth in the following claims.

I claim:

1. In a compression unit, the combination comprising a housing defining a chamber, a spider within said chamber of smaller dimension than said chamber, a plurality of outwardly extending arms connected to said spider in fixed relation thereto to form a substantially rigid unitary structure adapted to move within said chamber, guide means between said arms and said housing for providing guidance to movements of said spider within said chamber, said housing, spider, arms and guide means defining a plurality of compartments, said spider having an opening therein, an element in said opening and rotatable within said opening, and a shaft eccentrically positioned relative to the center of rotation of said element and fixedly connected to said element.

2. In an internal combustion engine, the combination comprising a housing defining a chamber, a spider within said chamber of smaller dimension than said chamber, a plurality of outwardly extending arms connected to said spider in fixed relation thereto to form a substantially rigid unitary structure adapted to move within said chamber, guide means between said arms and said housing for providing guidance to movements of said spider within said chamber, said housing, spider, arms and guide means defining a plurality of separate combustion chambers, said spider having an opening therein, an element in said opening and rotatable within said opening, and a shaft eccentrically positioned relative to the center of rotation of said element and fixedly connected to said element.

3. In an internal combustion engine, the combination comprising a housing defining a chamber, a unitary movable member in said chamber, said unitary member including a body of smaller dimension than said chamber and at least three elongated, outwardly extending arms fixedly connected to said body and disposed in permanently fixed relation to said body and at permanently fixed angles with respect to one another, guide means engaging each of said arms for guiding and stabilizing said member during its movement, each of said guide means affording movement of the arm which it engages both longitudinally and transversely of said arm, said spider having an opening therein, an element in said opening and rotatable within said opening, and a shaft eccentrically positioned relative to the center of rotation of said element and fixedly connected to said element.

(References on following page)

References Cited in the file of this patent

UNITED STATES PATENTS

| | | |
|---|---|---|
| 834,033 | Tuttle | Oct. 23, 1906 |
| 1,305,451 | Evans | June 3, 1919 |
| 1,734,433 | Hoyt | Nov. 5, 1929 |
| 2,295,117 | Koester | Sept. 8, 1942 |
| 2,660,365 | Paget | Nov. 24, 1953 |
| 2,680,348 | Wahlmark | June 8, 1954 |

FOREIGN PATENTS

| | | |
|---|---|---|
| 653,267 | Germany | Nov. 19, 1937 |